Patented Dec. 5, 1944

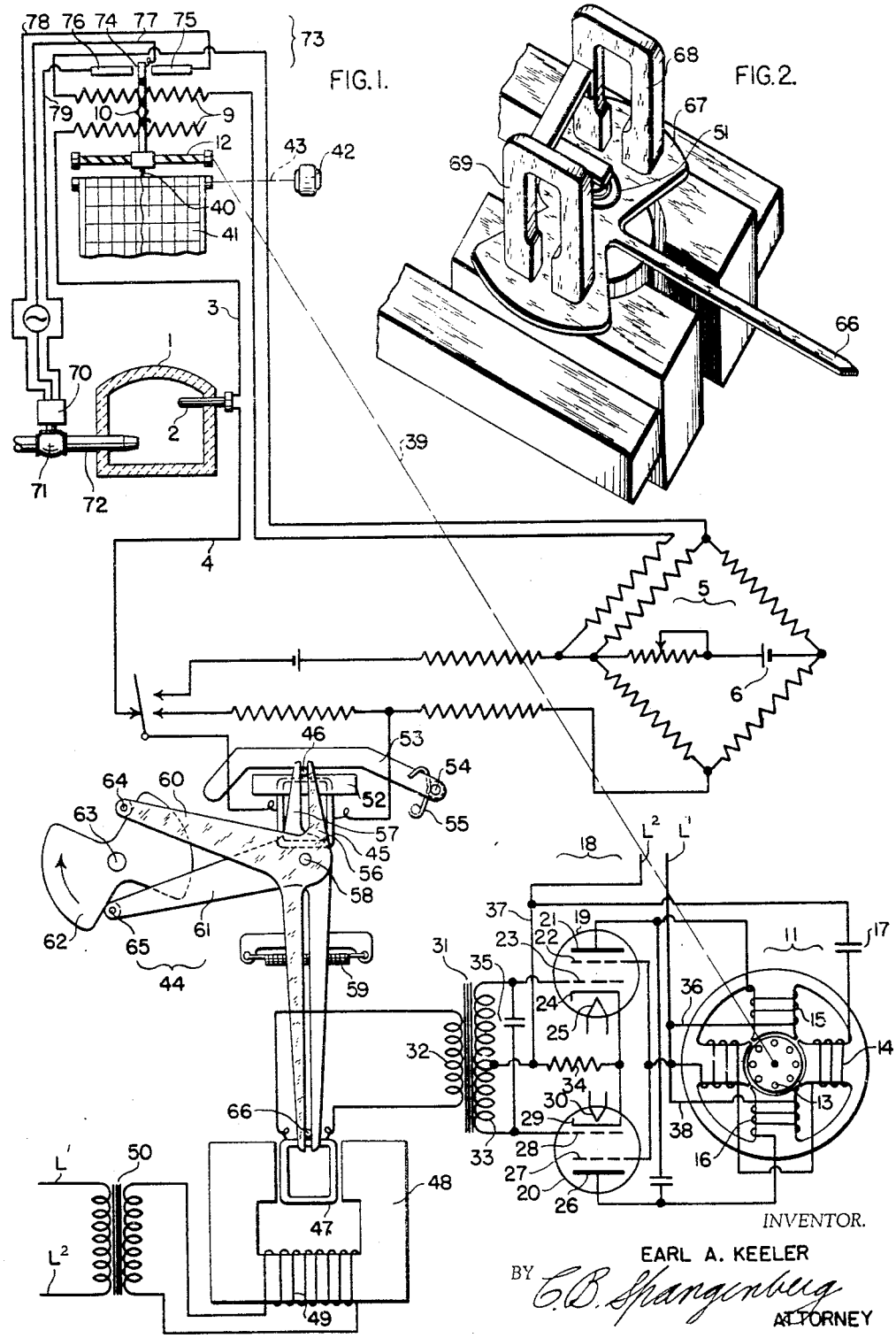

2,364,450

UNITED STATES PATENT OFFICE 2,364,450

MEASURING AND CONTROL APPARATUS

Earl A. Keeler, Norristown, Pa., assignor to The Brown Instrument Company, Philadelphia, Pa., a corporation of Pennsylvania Application March 13, 1941, Serial No. 383,150

11 Claims. (Cl. 171—95)

The present invention relates to improvements in measuring and controlling systems and apparatus therefor, and more particularly to measuring and controlling apparatus adapted to produce effects in accordance with the deflection of an element which controls the apparatus and deflects in accordance with the variations in a control quantity or in a quantity to be measured, and in which because of the small magnitude of the element deflecting force it is not desirable, nor possible to have the said effects directly produced by the deflecting element.

A general object of the invention is to provide an accurate measuring and/or controlling system which is inherently stable in operation.

Another object of the invention is to provide an accurate measuring and/or controlling system which is quick in its action and does not overrun or hunt and is especially adapted to produce the desired recording and/or controlling effects in response to small deflections of the most sensitive measuring instruments.

A further and more specific object of the invention is to provide an accurate measuring and/or controlling system which utilizes an extremely sensitive galvanometer and in which substantially no load is placed on the galvanometer in producing the desired recording and/or controlling effects in response to deflections thereof.

Another specific object of the invention is to provide an accurate measuring and/or controlling system of the type in which the deflecting element or pointer of a sensitive galvanometer is periodically clamped in ascertaining the extent of deflection thereof, and which is characterized in that the galvanometer deflecting element or pointer is clamped for only a relatively small portion of each clamping cycle and during the remaining and substantially larger portion of each such cycle the galvanometer is free of all restraining forces.

A further specific object of the invention is to provide an accurate measuring and/or controlling instrument in which an element deflecting in accordance with small changes in the value of a quantity to be measured and/or controlled is included in an instrument comprising a mechanical relay mechanism and an electronic relay mechanism, which cooperate to selectively control a reversible electrical motor for rotation in one direction or the other and thereby to adjust the recording pen, indicating pointer, or other exhibiting part of the instrument in accordance with the deflections of the deflecting element.

The improvements disclosed herein are improvements in measuring and/or controlling apparatus of the potentiometric and analogous types in which a contact engaging a resistance included in a measuring circuit is automatically adjusted along said resistance under control of a galvanometer as required to balance the electromotive force of a thermocouple, or other electromotive force to be measured, against the electromotive force in a portion of the measuring circuit including more or less of said resistance.

In such measuring apparatus, it has long been the practice in the prior art to employ a power shaft rotating in one direction, and a galvanometer controlled clutch means for periodically causing the shaft to give a circuit rebalancing movement in one direction or the other to an adjustable resistance engaging contact. Another and improved form of apparatus disclosed in the prior art comprises a reversible electrical motor controlled by the galvanometer, which motor by the rotation of its armature shaft in one direction or the other directly adjusts the resistance engaging contact. The use of a galvanometer controlled reversible motor in lieu of a power shaft rotating in one direction and associated clutch mechanism to give movement to the adjustable resistance engaging contact simplifies the construction of the apparatus, permits of more speedy rebalancing operations, and is otherwise advantageous.

The improvements devised by me and disclosed and claimed herein are improvements in the last mentioned form of apparatus referred to above. In accordance with the present invention, a deflectable coil located in an alternating field is periodically positioned in one direction or the other from a predetermined, zero position in response to deflections of the galvanometer deflecting element from a predetermined position, which galvanometer deflections are transmitted to the coil by means of a mechanical relay to derive an alternating electromotive force of one phase or of opposite phase in the coil. The alternating electromotive force so derived in the coil is amplified by a suitable electronic amplifier and the amplified quantity is applied directly to a reversible electrical motor which is adapted to adjust the resistance engaging contact to rebalance the measuring circuit. The mechanical relay utilized is characterized in that it does not place any load whatever upon the galvanometer in transmitting the deflections thereof to the coil positioned in the alternating field whereby the galvanometer may be made extremely sensitive, and is further characterized in that it restricts the movement of the galvanometer for only a relatively small part of each cycle of operation. The galvanometer is thus free of all restraining forces for the larger part of each cycle, which feature contributes appreciably to increased sensitivity, accuracy, and speed of operation of the instrument.

Means are provided to return the coil to its zero position in which no electromotive force is induced therein following each periodic adjustment of the coil from that position by the mechanical relay in response to deflection of the galvanometer. It is contemplated, in accordance with the present invention, to return the coil to its zero position at a rate slightly faster than the balancing adjustment of the measuring circuit as effected by the resistance engaging contact by the reversible electrical motor. This rate of return of the coil to its normal position may be controlled in any convenient manner as, for example, by suitable damping means.

With this arrangement it will be seen that it is possible to obtain continuous adjustment of the resistance engaging contact by the reversible motor and thereby continuous balancing adjustment of the measuring circuit even though the departure of the galvanometer deflecting element from its normal position is ascertained periodically. The operation of the instrument in effecting such continuous balancing adjustment of the measuring circuit, moreover, is extremely stable whereby the resistance engaging contact comes to rest at the precise balance position without overshooting and consequent hunting occurring.

The various features of novelty which characterize my invention are pointed out with particularity in the claims annexed to and forming a part of this specification. For a better understanding of the invention, however, its advantages and specific objects obtained with its use, reference should be had to the accompanying drawing and descriptive matter in which I have illustrated and described a preferred embodiment of the invention.

Of the drawing:

Fig. 1 is a diagrammatic representation of the use of the invention in a potentiometric recording and controlling system; and Fig. 2 illustrates in detail a portion of the arrangement of Fig. 1.

In Fig. 1 of the drawing an arrangement is illustrated for recording the variations in temperature in the interior of a furnace 1 in which a thermocouple 2 responsive to changes of temperature is arranged in heat transfer relation. The thermocouple 2 is connected by conductors 3 and 4 to the terminals of a self-balancing potentiometric network indicated generally by the reference numeral 5, which network may be of any suitable type such as the Brown potentiometric network disclosed in Patent 1,898,124, issued February 21, 1933, to Thomas R. Harrison.

The potentiometric network 5 is of a well known type and therefore it is sufficient for the present purposes to note that it comprises a circuit branch including the thermocouple 2 and an opposing circuit branch including a source of known potential such as a battery 6 and resistors 9, a variable portion of which may be connected into the opposed branches by means of a slicing contact 10 whereby the respective effects of the variable and known sources may be made equal and opposite. The potentiometric network is thus balanced for a given value of electromotive force developed by the thermocouple 2 with the contact 10 in a corresponding position along the resistors 9. The position of the contact 10 is then a measure of the value of the thermocouple electromotive force and may serve as a measure of the temperature to which the thermocouple is exposed.

In the embodiment of my invention illustrated in the drawing, the contact 10 is adjusted back and forth along resistors 9 in response to unbalance of the potentiometric network 5 by means including a reversible electrical motor 11 the rotation and direction of rotation of which is adapted to be selectively controlled by means to be described in response to potentiometric unbalance. Motor 11 is connected in any convenient manner to contact 10 for adjusting the latter along resistors 9 and effects rebalance of the potentiometric network 5 in response to a change in the electromotive force developed by the thermocouple 2. Specifically, the shaft of motor 11 is connected to a screw shaft 12 and is adapted to adjust a carriage on which the contact 10 is mounted in one direction or the other along the length thereof as the shaft 12 is rotated.

The reversible electrical motor 11 is of the induction type and includes a squirred cage rotor 13 and a pair of oppositely disposed field poles on which windings 14, 15 and 16 are wound. Winding 14 is wound on one pair of said field poles and is connected in series with a condenser 17 to the alternating current supply conductors $L^1$ and $L^2$. Due to the action of condenser 17 the current which flows through the winding 14 will lead the line voltage by approximately 90°. Winding 15 is wound on one pole of the other pair of field poles and winding 16 is wound on the other pole of said last mentioned pair. If desired, windings 15 and 16 may be equally distributed on the last mentioned pair of poles.

The means by which the rotation and direction of rotation of the reversible electrical motor 11 is selectively controlled in accordance with the state of balance of the potentiometric network 5 includes an electronic amplifier 18 to the input circuit of which an alternating electromotive force of one phase or of opposite phase is adapted to be impressed upon unbalance of the potentiometric network 5 in one direction or the other, and to the output circuit of which the motor windings 15 and 16 are connected. The electronic amplifier 18 includes a pair of electronic valves 19 and 20 which, as shown, are heater type tetrodes. Valve 19 includes an anode 21, a screen grid 22, a control grid 23, a cathode 24 and a heater filament 25. Valve 20 includes an anode 26, a screen grid 27, a control grid 28, a cathode 29 and a heater filament 30. Energizing current is supplied the heater filaments 25 and 30 from a suitable source of current not shown.

The electronic amplifier 18 also includes an input transformer 31 having a primary winding 32 and a secondary winding 33. One terminal of the secondary winding 33 is connected to the control grid 23 of the valve 19 and the other terminal thereof is connected to the control grid 28 of valve 20. A center tap on the secondary winding 33 is connected through a cathode biasing resistance 34 to the cathodes 24 and 29 which, as shown, are connected together. A condenser 35 is preferably connected between the terminals of the secondary winding 33.

Energizing current is supplied the output circuits of the electronic valves 19 and 20 from the alternating current supply conductors $L^1$ and $L^2$ through circuit connections which include the motor windings 15 and 16. The output circuit of valve 19 may be traced from the supply line $L^1$ to a conductor 36, the motor winding 15, anode 21, cathode 24, resistor 34 and a conductor 37 to the supply line $L^2$. The output circuit of valve 20 may be traced from the supply line $L^1$ to a conductor 38, motor winding 16, anode 26, cathode 29, resistor 34 and conductor 37 to the supply line $L^2$.

The alternating current supplied the motor windings 15 and 16 by the electronic amplifier 18 is substantially in phase with the voltage of the supply lines $L^1$ and $L^2$, and accordingly, the motor windings 15 and 16 establish fields in the motor which are displaced 90° with respect to that established therein by the winding 14. Motor windings 15 and 16, however, are oppositely wound, and therefore, the fields established thereby are displaced 180° with respect to each other. Thus, the field established by motor winding 15 is displaced 90° in one direction with respect to that established therein by the winding 14 and the field established by the winding 16 is displaced 90° in the other direction with respect to that established by the winding 14. The reaction between the field set up by winding 14 with that set up by winding 15 establishes a rotating field in the motor which rotates in one direction, and the reaction set up by the winding 14 with that set up by winding 16 establishes a rotating field in the motor which rotates in the opposite direction. As is explained in detail hereinafter, the conductivity of each of the eletctronic valves 19 and 20 is adapted to be selectively controlled in accordance with the state of balance of the potentiometric network 5 and thereby the motor windings 15 and 16 are adapted to be selectively energized in accordance with the condition of balance of the potentiometric network.

The motor rotor is connected by suitable gearing or coupling indicated by the reference numeral 39 to the screw threaded shaft 12 so that the contact 10 is adjusted along the slidewire resistors 9 in accordance with the direction of rotation of the motor. The direction and the duration of the rotation of the motor is controlled by the potentiometer unbalance so that the contact 10 is adjusted in the proper direction the precise amount to reduce the potentioimetric unbalance to zero.

If desired, a pen 40 may be mounted on the carriage which carries the potentiometer slidewire contact 10 and arranged in cooperative relation with a chart 41 to thereby provide a continuous record of the temperature within the interior of the furnace 1. The chart 40 may be a strip chart as shown and is adapted to be driven in any convenient manner as, for example, by a unidirectional electrical motor 42 through gearing indicated at 43 so that a record of the temperature to which the thermocouple is subjected will be recorded as a continuous line on the chart. It will be apparent that the slidewire resistances 9 may be mounted on a circular form, if desired, and that a circular chart may then be utilized for recording purposes in lieu of the strip chart 41.

The means referred to hereinbefore for controlling the selective energization of the motor windings 15 and 16 and thereby the selective energization of the motor 11 for rotation in one direction or the other in response to unbalance of the potentiometric network 5 comprises an electromechanical conversion arrangement including a mechanical relay mechanism indicated generally by the reference character 44. The electromechanical conversion arrangement includes a sensitive galvanometer which may be of the D'Arsonval type having a coil 45 which is supported for rotation by suitable suspension means or by pivots, as desired, and is positioned between the poles of a permanent magnet (not shown). The coil 45 is connected to the potentiometric network 5 and is adapted to deflect in one direction from a predetermined position upon unbalance of the potentiometric network in one direction and is adapted to deflect in the opposite direction from said position upon unbalance of the potentiometer in the other direction. The coil 45 carries a pointer 46 which is rigid therewith. The deflection of pointer 46 from a predetermined position is adapted to be detected by the mechanical relay mechanism 44 which periodically clamps the pointer 46 and adjusts the position of a coil 47 in accordance with the deflection of pointer 46.

The coil 47 is supported by suitable suspension means or pivots, as desired, in an alternating field established by a magnet 48 which, as shown, is energized by a field winding 49. Winding 49 receives energizing current from the alternating current supply conductors $L^1$ and $L^2$ through a transformer 50. Coil 47 is biased by a suitable spring 51, as seen in Fig. 2, into a position of zero inductive relation with the alternating field produced by magnet 48. In this position of the coil 47 substantially no voltage is induced therein. Coil 47 is adjusted in one direction or the other away from this position of zero inductive relation with the alternating field by the mechanical relay mechanism 44 under control of the galvanometer pointer 46. When coil 47 is adjusted in one direction from this zero position, an alternating electromotive force of one phase is induced therein, and when it is deflected in the opposite direction therefrom an alternating electromotive force of opposite phase is induced therein.

The means for clamping the pointer 46 comprises a stationary bar member 52 which is located beneath the pointer and a movable clamping bar 53 which is located above it and is pivoted at 54. Clamping bar 53 is biased for rotation in a counterclockwise direction towards its pointer clamping position by a spring 55 and is actuated for rotation in a clockwise direction by means to be described.

The position of the galvanometer pointer at the time the latter is clamped is adapted to be determined by a pair of scissors members 56 and 57 which are pivotally mounted on a pin 58 and are adapted to have their upper ends brought into engagement with the end of the pointer 46 by the pull of a spring 59 on their lower ends. The scissors member 56 includes an arm 60 which extends at an angle therefrom, as seen in the drawing, and the scissors member 57 includes an arm 61 which also extends at an angle therefrom. The arms 60 and 61 are held apart at their outer ends by a suitably configured cam 62 which is rigid with a continuously rotating shaft 63. The arms 60 and 61 have rollers 64 and 65, respectively, on their outer ends which bear on the edge of cam 62. The spring 59 operates to maintain the rollers 64 and 65 continuously in engagement with the edge of the cam 62.

As the cam 62 rotates with the constantly driven shaft 63, the arms 60 and 61 are alternately moved towards and away from each other and thereby alternately move the upper ends of the associated scissors members 56 and 57 towards and away from each other to thereby cause the latter to alternately engage and disengage the galvanometer pointer 46.

In the operation of the device, the shaft 63 and thereby the cam 62 are rotated in a clockwise direction as shown by the arrow. The parts are shown in the drawing in the position they assume when the galvanometer pointer 46 is in its normal, neutral position and the pointer has just been engaged by the scissors bars 56 and 57. Continued rotation of the shaft 63 from the position shown in the drawing will bring the high part of cam 62 between the rollers 64 and 65 whereby the scissors member 56 will be rotated in a clockwise direction from the position shown and the scissors member 57 will be rotated in a counterclockwise direction from the position shown. As the scissors member 56 is rotated in a clockwise direction, it engages and rotates the clamping bar 53 about its pivot point 54 to raise the clamping bar 53 and thereby to release the pointer 46. The galvanometer pointer 46 is then free to deflect to a new position corresponding to the state of the potentiometric balance.

Upon deflection of the galvanometer pointer 46 to the right, for example, from its normal neutral position as seen in the drawing, continued rotation of the cam 62 will operate first to cause the bar 53 to clamp the galvanometer pointer 46 and thereafter to cause the scissors bars to engage the pointer 46 in its deflected position. The clamping action is produced by the action of gravity and by spring 55 which effect rotation of bar 53 in a counterclockwise direction as the arm 60 is moved in a downward direction. After the pointer 46 has been clamped, the upper end of scissors member 56 will engage the pointer, following which further motion of the scissors member 56 in the counterclockwise direction is prevented by the clamped pointer. The clockwise motion of the scissors member 57 continues, however, until it also engages the galvanometer pointer 46. Thereafter, continued rotation of the cam 62 operates to move the scissors arms 57 and 56 in succession away from the pointer 46, following which the clamping bar 53 is raised by engagement therewith of arm 60 to thereby release the pointer 46. It is noted that upon deflection of the pointer 46 to the left, the upper end of scissors member 57 will engage the pointer first and thereafter the pointer will be engaged by the scissors member 56.

The lower ends of the scissors arms 56 and 57 are disposed on the opposite sides of a pointer 66 which is carried by and is rigid with the coil 47. The scissors members 56 and 57 are so arranged that when the upper ends thereof are both in engagement with the pointer 46, the lower ends thereof are both in engagement with the pointer 66. When the upper ends of the scissors members 56 and 57 are moved until they both engage the pointer 46, the lower ends of said members will adjust the pointer 66 and thereby the coil 47 into a position corresponding to the position of the pointer 46. Thus, when the pointer 46 is deflected in one direction or the other from its normal, neutral position, the coil 47 will be given an adjustment in a corresponding direction and of a corresponding amount from its position of zero inductive relation with the alternating magnetic field produced by magnet 48. By making the lower ends of scissors members 56 and 57 longer then the upper ends thereof, as illustrated, it will be seen that the magnitude of the rotational adjustment given the coil 47 may be made larger than the deflection of the galvanometer coil 45 whereby the effect of deflection of the latter is magnified. This operates to increase the sensitivity of the apparatus.

The terminals of the coil 47 are connected through suitable pigtails or slip rings to the terminals of the transformer primary winding 32 wherein the alternating electromotive forces induced in the coil 47 are amplified and the amplified quantity is impressed upon the input circuits of the electronic valves 19 and 20 to control the relative conductivities of the latter. When an alternating electromotive force of one phase is induced in the coil 47, the control grid 23 of the electronic valve 19 will be rendered less negative during the half cycles when the anode 21 is positive and the control grid 28 of valve 20 will be rendered more negative during the same half cycles, during which half cycle the anode 26 is positive. Thus, the conductivity of the valve 19 is increased with respect to that of the valve 20, and accordingly the supply of current to the motor winding 15 will be increased and the supply of current to the motor winding 16 will be decreased. This operates to produce rotation of the motor in one direction. When an alternating electromotive force of the opposite phase is induced in the coil 47, the conductivity of the valve 20 will be increased relatively to that of the valve 19 and as a result the supply of energizing current to the motor winding 16 will be greater than the supply of current to the motor winding 15 whereupon the motor will be energized for rotation in the opposite direction. The alternating voltage derived in the coil 47, therefore, is adapted to selectively control the energization of the motor 11 for rotation in one direction or the other.

It is noted the coil 47 may be rugged in construction and may be quite large so that an alternating electromotive force of an appreciable magnitude may be induced therein upon deflection from its zero position. When such a coil 47 is employed it is not necessary to use a complicated amplifier 18 for amplifying the induced electromotive forces. It is possible to utilize a large, rugged coil 47 since the latter does not place any load on the galvanometer 45. For this same reason the galvanometer utilized may be of light weight and extremely sensitive.

In Fig. 2 I have illustrated a preferred arrangement of the coil 47 and the magnet 48 utilized in the arrangement of Fig. 1. As shown in Fig. 2, the coil 47 carries an aluminum vane 67 which may be integral with the pointer 66. A pair of permanent magnets 68 and 69 are located above the vane 67 with their pole pieces displaced only a slight distance from the vane. Relative motion between the vane 67 and the permanent magnets 68 and 69 operate to induce eddy currents in the vane 67 which tend to retard the motion of the latter. Thus, the rate at which the spring 51 operates to restore the coil 47 to its zero position upon deflection thereof is retarded. The rate at which the coil 47 is restored to its zero position may be adjusted as desired by varying the strength of the magnets 8 and 69 and/or the spacing between the latter and the vane 67. I prefer to so adjust the component parts of the system that the coil 47 is returned to its zero position at a rate slightly faster than the balancing adjustment of the potentiometric network 5 effected by adjustment of the contact 10 along the resistors 9 by the reversible motor 11.

With this arrangement, it is possible by suitably configuring cam 62 to reduce to a minimum the time during which the galvanometer pointer 46 is clamped and thereby prevented from moving freely since it is only necessary to clamp the pointer for a time sufficient to deflect the coil 47 from its zero position. The galvanometer pointer 46 may then be released but because of the retarding action of the magnets 68 and 69, the coil 47 is not returned immediately to its zero position but is returned to that position at a suitably slow rate. As a result, the motor 11 is energized for rotation for a period of time depending upon the extent of deflection of the coil 47 and the rate at which the latter is restored to its normal, neutral position. It will be apparent that by suitably adjusting the rate at which the coil 47 is returned to its zero position that continuous operation of the motor 11 in effecting rebalance of the potentiometric network 5 may be obtained at a gradually decreasing speed up to the last few cycles of operation of the mechanical relay mechanism 44 during which the galvanometer pointer 46 is deflected whereupon small rebalancing adjustments of the potentiometric network are produced.

It will be apparent that the supply of heating agent to the furnace 1 may be controlled in accordance with the deflection of the recording pen 40 along the chart 41. For example, a reversible electrical motor 70 having two opposed field windings (not shown) may be utilized to adjust a fuel valve 71 disposed in a pipe 72 which supplies fuel to the furnace 1. To this end, the reversible motor 70 is energized for rotation in one direction or the other depending upon the direction of deflection of the pen 40 from a predetermined position along the chart 41, which position corresponds to the temperature it is desired to maintain in the furnace.

Specifically, a switch 73 which is actuated in accordance with the adjustments of the recording pen is provided for controlling the energization of the motor 70. The switch 73 comprises a switch arm 74 which is insulated from but is carried by the same support which carries the pen 40 and the potentiometer contact 10, and also two elongated contact segments 75 and 76 which are disposed on opposite sides of the arm 74. The arm 74 is connected by a conductor 77 to one side of an alternating current supply source. The contact segment 75 is connected by a conductor 78, in which one winding of the motor 70 is inserted, to the other side of the alternating current supply source and the contact segment 76 is connected by a conductor 79, in which the other winding of the motor 70 is inserted, to the said other side of the supply source.

With the arrangement described, when the arm 74 is intermediate the contact segments 75 and 76, the motor 70 is not energized for rotation in either direction, but when the arm 74 is in engagement with the contact segment 76, the motor is energized for rotation in the direction to open the fuel valve 71 and thereby to increase the supply of fuel to the furnace 1. When the arm 74 is in engagement with the contact segment 75, the motor 70 is energized for rotation in the opposite direction and effects a closing adjustment of the valve 71 and thereby a decrease in the supply of fuel to the furnace.

Although not shown the contact segments 75 and 76 of the switch 73 are desirably made adjustable relatively to each other and to the chart 41 so that both the sensitivity and the control point setting of the apparatus may be adjusted in a manner well known in the art.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. In measuring apparatus comprising a balanceable network, a galvanometer in a branch of said network, and an impedance in said network adapted to be adjusted to rebalance said network upon unbalance thereof, the combination with said galvanometer of means adapted to be adjusted for deriving from an original source of alternating current an alternating electromotive force of one phase or of opposite phase, means to control the adjustment of said impedance by said derived alternating electromotive force, and mechanical relay means controlled by said galvanometer to adjust said deriving means.

2. In measuring apparatus comprising a balanceable network, a galvanometer in a branch of said network, said galvanometer having a deflecting element, an impedance in said network adapted to be adjusted to rebalance said network upon unbalance theerof, and motive means to adjust said impedance, the combination with said galvanometer of means for producing an alternating magnetic field, a coil located in said field adapted to be adjusted in one direction or the other from a predetermined position in which it is in zero inductive relation with the alternating field to derive an alternating electromotive force of one phase or of opposite phase therein, means to control the operation of said motive means by said derived alternating electromotive force, and mechanical relay means controlled by said galvanometer to adjust the position of said coil in said field in accordance with the position of the deflecting element of said galvanometer.

3. In measuring apparatus comprising a balanceable network, a galvanometer in a branch of said network, said galvanometer having a deflecting element, an impedance in said network adapted to be adjusted to rebalance said network upon unbalance thereof, and motive means to adjust said impedance, the combination with said galvanometer of means for producing an alternating magnetic field, a coil located in said field adapted to be adjusted in one direction or the other from a predetermined position in which it is in zero inductive relation with the alternating field to derive an alternating electromotive force of one phase or of opposite phase therein, means to restore said coil to said predetermined position upon adjustment therefrom, phase responsive means to control the operation of said motive means by said derived alternating electromotive force, mechanical relay means controlled by said galvanometer to periodically adjust the position of said coil in said field in accordance with the position of the deflecting element of said galvanometer, and means to control the rate at which said coil is restored to said predetermined position.

4. In measuring apparatus comprising a balanceable network, a galvanometer in a branch of said network, said galvanometer having a deflecting element, an impedance in said network adapted to be adjusted to rebalance said network upon unbalance thereof, and a reversible electrical motor having a pair of windings to adjust said impedance, the combination with said galvanometer of a source of alternating current, a connection between said alternating current source and one of said motor windings, means energized by said alternating current source to produce an alternating field, a coil located in said field adapted to be adjusted in one direction or the other from a predetermined position in which it is in zero inductive relation with the alternating field to derive an alternating electromotive force of one phase or of opposite phase therein, means to restore said coil to said predetermined position upon adjustment therefrom, phase responsive means to directly control the energization of the other winding of said motor by said derived alternating electromotive force, mechanical relay means responsive to the position of the deflecting element of said galvanometer to periodically adjust the position of said coil in said field, and means to control the rate at which said coil is restored to said predetermined position.

5. In measuring apparatus comprising a balanceable network, a galvanometer in a branch of said network, said galvanometer having a deflecting element, an impedance in said network adapted to be adjusted to rebalance said network upon unbalance thereof, and motive means to adjust said impedance, the combination with said galvanometer of means for producing an alternating magnetic field, a coil located in said field adapted to be adjusted in one direction or the other from a predetermined position in which it is in zero inductive relation with the alternating field to derive an alternating electromotive force of one phase or of opposite phase therein, means to restore said coil to said predetermined position upon adjustment therefrom, phase responsive means to control the operation of said motive means by said derived alternating voltage, cyclically operating means to periodically hold the deflecting element of said galvanometer stationary, power operated means responsive to the position of said deflecting element during the time it is held stationary to adjust said coil into a position corresponding with the then position of said deflecting element, and means to control the rate at which said coil is restored to said predetermined position.

6. In measuring apparatus, a pointer movable from a predetermined position in accordance with the changes in magnitude of a variable condition, an adjustable mechanism, adjustable means for deriving from an original source of alternating voltage an alternating voltage of one phase or of opposite phase, means to control said adjustable mechanism by said derived alternating voltage, and mechanical relay means responsive to the position of said pointer to adjust said deriving means.

7. In measuring apparatus, a pointer movable from a predetermined position in accordance with the changes in magnitude of a variable condition, an adjustable mechanism, motive means to adjust said adjustable mechanism, means for producing an alternating magnetic field, a coil located in said field adapted to be adjusted in one direction or the other from a predetermined position in which it is in zero inductive relation with the alternating field to derive an alternating electromotive force of one phase or of opposite phase therein, means to control the operation of said motive means by said derived alternating voltage, and mechanical relay means responsive to the position of said pointer to adjust the position of said coil in said field in accordance with the position of said pointer.

8. In measuring apparatus, a pointer movable from a predetermined position in accordance with the changes in magnitude of a variable condition, an adjustable mechanism, motive means to adjust said adjustable mechanism, means for producing an alternating magnetic field, a coil located in said field adapted to be adjusted in one direction or the other from a predetermined position in which it is in zero inductive relation with the alternating field to derive an alternating electromotive force of one phase or of opposite phase therein, means to restore said coil to said predetermined position upon adjustment therefrom, phase responsive means to control the operation of said motive means by said derived alternating voltage, mechanical relay means responsive to the position of said pointer to adjust the position of said coil in said field in accordance with the position of said pointer, and means to control the rate at which said coil is restored to said predetermined position.

9. In measuring apparatus, a pointer movable from a predetermined position in accordance with the changes in magnitude of a variable condition, mechanism adapted to be adjusted to restore said pointer to said predetermined position upon departure therefrom, motive means to adjust said adjustable mechanism, means for producing an alternating magnetic field, a coil located in said field adapted to be adjusted in one direction or the other from a predetermined position in which it is in zero inductive relation with the alternating field to derive an alternating electromotive force of one phase or of opposite phase therein, means to restore said coil to said predetermined position upon adjustment therefrom, phase responsive means to control the operation of said motive means by said derived alternating voltage, mechanical relay means responsive to the position of said pointer to adjust the position of said coil in said field in accordance with the position of said pointer, and means to control the rate at which said coil is restored to said predetermined position.

10. In measuring apparatus, a pointer movable from a predetermined position in accordance with the changes in magnitude of a variable condition, mechanism adapted to be adjusted to restore said pointer to said predetermined position upon departure therefrom, motive means to adjust said adjustable mechanism, means for producing an alternating magnetic field, a coil located in said field adapted to be adjusted in one direction or the other from a predetermined position in which it is in zero inductive relation with the alternating field to derive an electromotive force of one phase or of opposite phase therein, means to restore said coil to said predetermined position upon adjustment therefrom, phase responsive means to control the operation of said motive means by said derived alternating voltage, cyclically operating means to periodically hold said pointer stationary, power operated means responsive to the position of said pointer during the time it is held stationary to adjust said coil into a position corresponding with the then position of the pointer, and means to control the rate at which said coil is restored to said predetermined position.

11. In measuring apparatus, a pointer movable from a predetermined position in accordance with the changes in magnitude of a variable condition, mechanism adapted to be adjusted to restore said pointer to said predetermined position upon departure therefrom, a reversible electrical motor having a pair of windings to adjust said adjustable mechanism, a source of alternating current, a connection between said alternating current source and one of said motor windings, means energized by said alternating current source to produce an alternating magnetic field, a coil located in said field adapted to be adjusted in one direction or the other from a position in which it is in zero inductive relation with the alternating field to derive an alternating electromotive force of one phase or of opposite phase therein, phase responsive means to directly control the energization of the other winding of said motor by said derived alternating voltage, mechanical relay means responsive to the position of said pointer to periodically adjust the position of said coil in said field in accordance with the position of said pointer, and means to control the rate at which said coil is restored to said predetermined position.

EARL A. KEELER.